March 7, 1950        E. W. DAVIS        2,499,571
OILING SYSTEM
Filed July 19, 1946        2 Sheets-Sheet 2
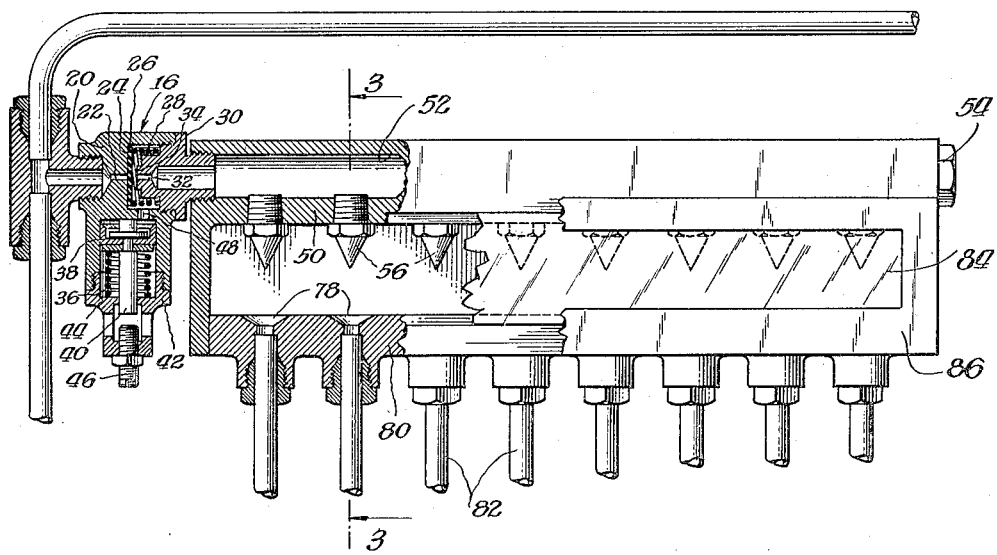
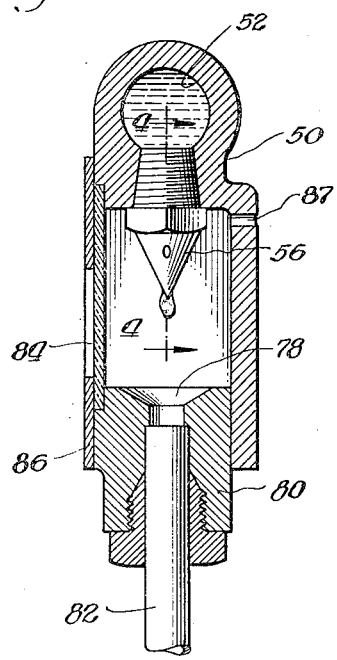 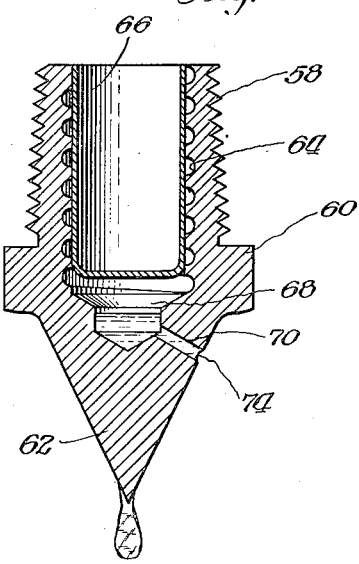
Inventor:
Ernest W. Davis
By Hinkel, Horton, Ahlberg, Hausmann & Hupper
Attorneys Patented Mar. 7, 1950

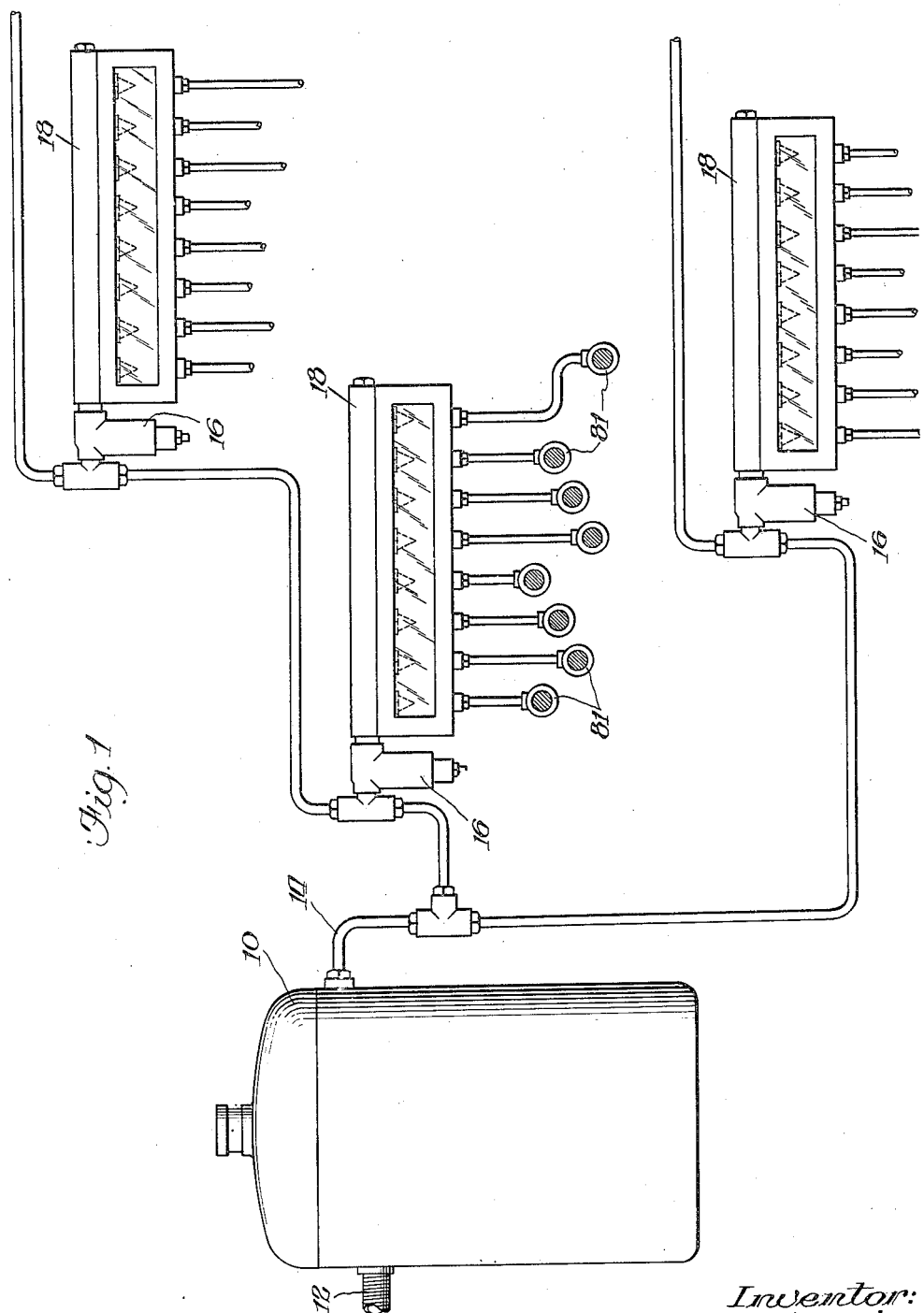

2,499,571

UNITED STATES PATENT OFFICE 2,499,571

OILING SYSTEM

Ernest W. Davis, River Forest, Ill.

Application July 19, 1946, Serial No. 684,644

8 Claims. (Cl. 184—7)

My invention relates generally to lubricating apparatus, and more particularly to a centralized oiling system.

It is an object of the invention to provide an improved oiling system which can be manufactured at low cost and which provides efficient, dependable, and otherwise satisfactory lubrication of a plurality of bearings.

A further object is to provide an improved centralized oiling system which utilizes flow restricting resistance outlets for metering the oil supplied to a plurality of bearings located at different elevations and different distances from the pump.

A further object is to provide an improved low resistance fitting in which it is unnecessary to provide a check valve to prevent syphoning.

In lubricating systems of the prior art utilizing oil and in which the relative quantities supplied to the bearings being lubricated was determined by provision of flow restricting resistances, it was necessary to provide each outlet with a check valve to prevent reverse flow due to the syphoning effect. When the outlets were not located at exactly the same elevation, and it is not usual that they would be at the same height, difficulty was experienced in preventing syphoning of oil from a conduit leading to an elevated outlet or bearing to an outlet at a lower level, during the periods between lubricating operations. To prevent such syphoning action, it has been customary to employ a check valve in each of the outlets. However, such check valves frequently failed to seat properly due to the presence of lint or other foreign particles in the oil, and syphoning was therefore not always avoided.

In the system of my invention, the resistance unit outlets are arranged in groups, all of the units of the group being at the same elevation, and each group supplied from the conduit system by a separate charge measuring device provided with a check valve of such large contact area with its seat, and of such flexibility that it performs satisfactorily even though lint or other foreign particles lodge between the valve and its seat.

Another object of this invention is to provide an improved method of equalizing the flow effect of different resistance outlets located at various distances from the pump which supplies the system with oil. In prior oiling systems of this class, it has been customary to employ resistance outlets having relatively high resistance, so that the proportional effect of the line resistance does not have a predominating action in determining the rate of flow. But in the oiling system of this invention, the resistance outlets have relatively low resistance, the flow restricting passageways are larger, and the tendency to clog, due to foreign particles in the oil, is reduced to a minimum. Such low resistance outlets are usable in this oiling system because the oil pressure supplied thereto is reduced to a predetermined low pressure, and the low pressure is usable because all the resistance outlets in any individual group are located at the same elevation.

The invention is illustrated in the drawings, in which:

Fig. 1 is an elevational view of an exemplary centralized lubricating system embodying the invention;

Fig. 2 is a fragmentary sectional view of the manifold unit used to supply one group of bearings, the figure being to an enlarged scale;

Fig. 3 is a sectional view, taken on the line 3—3 of Fig. 2; and

Fig. 4 is a fragmentary sectional view, taken on the line 4—4 of Fig. 3.

The lubricating system is illustrated as comprising a lubricant reservoir 10 in which is located an electrically operated pump supplied with current from line wires in an electrical conduit 12. The pump is arranged to operate intermittently as by a suitable time switch, so that lubricant under pressure is discharged through a conduit 14 at suitable spaced intervals, the frequency depending upon the character of the machine or machines being lubricated by the system. The conduit 14 is suitably connected to a plurality of primary flow metering or regulating devices consisting of measuring valves 16 which in turn are connected to supply lubricant to manifold units 18, illustrated as three in number, but which might be of any number required.

Each of the measuring valves 16, as shown in Fig. 2, comprises a body 20 having an inlet port 22 surrounded by a large valve seat 24. A valve 26 is pressed against the seat 24 by a spring 28. A nipple 30 is threaded in the body 20 and has an outlet port 32 surrounded by a valve seat 34. The body 20 is provided with a depending cylinder 36 in which a piston 38 is reciprocable, the piston 38 being preferably a cup-shaped washer of leather or synthetic rubber suitably secured to a piston stem 40. The stem 40 is guided in a cap 42 threaded in the lower end of the body 20, and is urged upwardly by a compressed coil spring 44. The length of the stroke of the piston may be adjustably limited by an adjusting screw 46, the end of which forms a stop for the piston rod 40. The cylinder 36 is normally in communication with the outlet port 32 by way of a port 48.

The valve 26 is preferably made of a relatively soft synthetic rubber substitute which is not deteriorated by contact with oil, such as Thiokol, neoprene, and the like.

The manifold unit 18 may be in the form of a body casting 50 having a manifold passageway 52 communicating with the port 32 in the fitting 30, and having its other end closed by a suitable plug 54. A plurality of secondary flow metering or regulating devices or fittings 56 are threaded in the body 50 and provide outlets from the manifold 52.

As best shown in Fig. 4, each of the fittings 56 comprises an externally threaded shank 58, a hexagonal wrench engaging portion 60, and a conical drop forming tip 62. The shank portion 58 is provided with an internal helical groove 64 for the flow of lubricant, the passageway being completed by a closed end cylindrical shell 66 pressed into place. The oil may thus enter the upper end of the helical passageway 64, flow downwardly through the spiral groove, and enter a pocket 68.

A passageway 70 leads from the pocket 68 to the external surface of the conical portion 62. This passageway is of relatively small diameter, in the order of .03", so that when lubricant is not being forced through the resistance unit, a meniscus 74 will form at the outer end of this passageway and the surface tension of the oil will, in effect, result in this meniscus operating as a check valve, preventing entrance of air. Thus, while the manifold units 18 should be mounted so that the outlets of the passageways 70 of the different resistance units are at the same elevation, in actual practice there may be some deviation from this desirable condition, due to inaccuracies of manufacture and installation. In such circumstances there would be a tendency for the oil to syphon from the lowermost resistance fitting 56, and air would thus flow into the fitting at the highest elevation if it were not for the fact that the passageways 70 are so small that the surface tension is capable of maintaining the meniscus at the end of the passageway 70 against the suction effect provided by a head of an inch or so of oil. Thus, it is not essential that the outlets of the passageways 70 of the different resistance units be at exactly the same level.

The oil flowing from the passageway 70 of each of the fittings collects in a drop at the point of its conical portion 62 and drips therefrom into one of a plurality of funnel-like depressions 78 formed in a base 80 suitably secured to the casting 50. Each of the funnel-like depressions 78 is connected by a conduit 82 to a bearing 81 to be supplied with oil. One side of the casting 50 has an opening 82 covered by a glass or plastic window pane 84 held in place by a frame 86. A vent port 87 (Fig. 3) in the casting 50 may be provided to assure that the drip chamber will be maintained at atmospheric pressure.

In operation of the apparatus, upon each application of pressure the valves 26 are forced away from their seats 24 and against the seats 34, and oil under pressure flowing past these valves and through ports 48 enters the cylinders 36 and forces the pistons 38 downwardly to the extent permitted by their adjusting screws 46. As soon as lubricant flow past any of the valves 24 ceases, this valve is forced tightly against its seat by the spring 26, thereby permitting the spring pressed piston 38 to force the oil in the cylinder 36 through ports 48 and 32 into the manifold passageway 52. Oil is thereby simultaneously forced through the helical passageways 64 of the different units and drips therefrom into the funnel-shaped depressions 78 and flows through the conduits 82 to the various bearings.

The fact that the system is operating properly may readily be observed through the window 84. The timing of the applications of oil pressure to the system will generally be so related to the rate at which oil is to be supplied to the various bearings that the pistons 38 will have discharged the oil from their cylinders 36 before the pump again supplies oil under pressure to the system.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a centralized lubricating system having a conduit system and a pump intermittently supplying oil under pressure to the conduit system, the combination of an oil measuring valve connected to the conduit system, a manifold receiving oil from the measuring valve, a plurality of resistance units connected to the manifold, each of said units comprising means forming a flow restricting passageway and an outlet, the outlets of the various resistance units being at substantially the same lever, and means to convey oil flowing from the resistance unit outlets to different bearings.

2. The combination set forth in claim 1, in which the outlets of the resistance units are of such small size that syphoning is prevented due to the surface tension of the oil at the outlet.

3. The combination set forth in claim 1, in which each of the resistance units is provided with a drop forming tip and in which the drop forming tips are enclosed in a compartment at atmospheric pressure having a window, and in which the drops from the tips are collected in depressions formed in the floor of the compartment and in which conduit means connect the depressions in the floor with the parts to be lubricated respectively.

4. In a centralized lubricating system having a conduit system and a pump intermittently supplying oil under pressure to the conduit system, the combination of an oil measuring valve connected to the conduit system to receive a predetermined charge of oil while the oil is under pressure in the conduit system and to discharge the oil at relatively low pressure during the intervals when the oil in the conduit system is not under pressure, a manifold connected to, and receiving oil from, the measuring valve, a plurality of flow resistance units connected to the manifold, each of said units comprising means forming a flow restricting passageway and an outlet, the outlets of the various resistance units being at substantially the same level, and means to convey oil flowing from the resistance unit outlets to different bearings.

5. In a centralized oiling system having an oil pump intermittently discharging oil under pressure and an oil conduit system connected with the pump to receive intermittent discharges of oil therefrom, the combination of a plurality of primary metering units each connected with the oil conduit and each receiving oil therefrom, a plurality of discharge manifolds, each connected with one of said primary metering units and each receiving a metered discharge of oil from its respective primary metering unit for each intermittent discharge of oil from the oil pump, and a plurality of groups of secondary metering units, each group being connected with one of said discharge manifolds and receiving oil therefrom, and each said secondary metering unit having a capillary discharge outlet discharging into atmosphere, and all said discharge outlets of any single group being positioned at approximately the same elevation, whereby the surface tension of the oil menisci at said outlets prevent syphoning of oil from one discharge outlet to another during the time intervals between said intermittent discharges of oil into said discharge manifolds.

6. In a centralized oiling system having an oil pump for intermittently discharging oil under pressure and an oil conduit connected with the pump to receive intermittent discharges of oil therefrom, the combination of a plurality of primary flow regulating devices each connected with the oil conduit and each receiving oil therefrom, said primary flow regulating devices comprising displacement measuring valves, and a group of secondary flow regulating devices for each said primary flow regulating device, each said secondary flow regulating device receiving oil from its respective primary flow regulating device, and all said secondary flow regulating devices comprising flow restricting passageways, whereby oil discharged by said pump is first measured by displacement and then proportioned by resistance.

7. In a centralized oiling system having an oil pump intermittently discharging oil under pressure and an oil line connected to the pump to receive the intermittent discharge of oil therefrom, the combination of a plurality of displacement type measuring valves, and a plurality of groups of resistance devices, each having a flow restricting oil passageway therein, said measuring valves being connected in multiple to said oil line, and each measuring valve being connected in series with one of said groups of resistance devices, said resistance devices in each group being connected in multiple.

8. In a centralized oiling system having an oil pump intermittently discharging oil under pressure and an oil line connected with the pump to receive oil therefrom, the combination of a plurality of groups of resistance outlets, each outlet having a flow restricting oil passageway therein, and a displacement metering device connected between said oil line and each group of resistance outlets, each metering device including discharging mechanism operative to produce a relatively low predetermined outlet pressure, whereby the oil pressure supplied to each said group of resistance outlets is determined by said predetermined low pressure and not by the pressure in the oil line or of the pump supplying oil thereto.

ERNEST W. DAVIS.

REFERENCES CITED

The following references are of record in the file of this patent:

UNITED STATES PATENTS

| Number | Name | Date |
|---|---|---|
| 1,905,527 | Thomas | Apr. 25, 1933 |
| 1,968,017 | Davis | July 31, 1934 |
| 1,996,912 | Ericson | Apr. 9, 1935 |
| 2,363,754 | Smith | Nov. 28, 1944 |